(12) United States Patent
Noel et al.

(10) Patent No.: US 9,771,831 B2
(45) Date of Patent: Sep. 26, 2017

(54) EXHAUST CASING COMPRISING A FLUID DISCHARGE DEVICE AND TURBINE ENGINE

(71) Applicant: SNECMA, Paris (FR)

(72) Inventors: Frederic Noel, Yerres (FR); Benoit Argemiro Matthieu Debray, Saint-Maur-des-Fosses (FR); Mario Cesar De Sousa, Cesson (FR); Gregory Ghosarossian-Prillieux, Brie Comte Robert (FR)

(73) Assignee: SNECMA, Paris (FR)

( * ) Notice: Subject to any disclaimer, the term of this patent is extended or adjusted under 35 U.S.C. 154(b) by 380 days.

(21) Appl. No.: 14/494,905

(22) Filed: Sep. 24, 2014

(65) Prior Publication Data

US 2015/0082769 A1    Mar. 26, 2015

(30) Foreign Application Priority Data

Sep. 25, 2013  (FR) ...................... 13 59227

(51) Int. Cl.
*F01D 25/30* (2006.01)
*F01D 25/00* (2006.01)
(Continued)

(52) U.S. Cl.
CPC ........... *F01D 25/30* (2013.01); *F01D 25/002* (2013.01); *F01D 25/18* (2013.01); *F02C 7/06* (2013.01);
(Continued)

(58) Field of Classification Search
CPC ............... F02C 7/06; F05D 2260/6022; F05D 2260/605; F05D 2260/608; F05D 2260/602; F01D 25/18; F01D 25/002; F01D 25/162
See application file for complete search history.

(56) References Cited

U.S. PATENT DOCUMENTS 2,888,302 A * 5/1959 Cox ..................... F01D 25/18
384/469
3,372,874 A * 3/1968 Colville ................ C03C 17/25
239/127.3
(Continued)

FOREIGN PATENT DOCUMENTS

EP  1 749 977 A1  2/2007
EP  1 921 276 A2  5/2008
(Continued)

OTHER PUBLICATIONS

French Preliminary Search Report and Written Opinion issued Jun. 23, 2014 in Patent Application No. 1359227 (with English translation of categories of cited documents).

*Primary Examiner* — Pascal M Bui Pho
*Assistant Examiner* — Eric Linderman
(74) *Attorney, Agent, or Firm* — Oblon, McClelland, Maier & Neustadt, L.L.P.

(57) ABSTRACT

The invention relates to a turbine engine exhaust casing (1), characterized in that it comprises:
  a hub (2),
  an outer ring (3);
  a plurality of structural arms (10) arranged circumferentially between the hub (2) and the outer ring (3);
  a stiffener (11) extending along at least a portion of the inner circumference of the hub (2),
the hub (2) comprising at least one discharge hole (15), and the stiffener (11) comprising at least one discharge slot (16), so as to enable the discharge of a fluid from the casing (1). The invention also relates to a turbine engine comprising such an exhaust casing.

10 Claims, 3 Drawing Sheets

(51) Int. Cl.
*F01D 25/18* (2006.01)
*F02C 7/06* (2006.01)

(52) U.S. Cl.
CPC .. *F05D 2260/602* (2013.01); *F05D 2260/607* (2013.01)

(56) References Cited

U.S. PATENT DOCUMENTS

| | | | | |
|---|---|---|---|---|
| 3,970,252 A * | 7/1976 | Smale | ................ | F02K 1/825 239/127.3 |
| 4,214,441 A * | 7/1980 | Mouritsen | ............ | F02K 1/825 239/127.3 |
| 4,900,220 A * | 2/1990 | Guimier | ............ | F01D 25/30 415/136 |
| 6,102,577 A * | 8/2000 | Tremaine | ............ | F01D 9/065 184/104.1 |
| 6,330,790 B1 * | 12/2001 | Arora | ............ | F01D 11/04 277/303 |
| 8,051,952 B2 * | 11/2011 | Bart | ............ | B01D 45/14 184/6.11 |
| 8,312,726 B2 * | 11/2012 | Wong | ............ | F01D 25/162 415/142 |
| 9,016,068 B2 * | 4/2015 | Martin | ............ | F02C 7/20 244/58 |
| 9,234,443 B2 * | 1/2016 | Ito | ............ | F01M 5/025 |
| 9,316,153 B2 * | 4/2016 | Patat | ............ | F01D 9/02 |
| 2005/0132710 A1 * | 6/2005 | Peters | ............ | F01D 25/18 60/772 |
| 2006/0117545 A1 * | 6/2006 | Hart | ............ | B21D 39/031 29/521 |
| 2007/0028590 A1 | 2/2007 | Bart et al. | | |
| 2007/0028947 A1 * | 2/2007 | Erickson | ............ | F01D 25/002 134/22.18 |
| 2008/0041033 A1 * | 2/2008 | Durocher | ............ | F02K 1/04 60/226.1 |
| 2008/0073154 A1 * | 3/2008 | Eleftheriou | ............ | F01D 25/18 184/105.1 |
| 2008/0080800 A1 * | 4/2008 | Blais | ............ | F01D 25/18 384/462 |
| 2008/0107522 A1 | 5/2008 | DiBenedetto | | |
| 2008/0226445 A1 * | 9/2008 | Pommier | ............ | F01D 25/30 415/201 |
| 2009/0101444 A1 * | 4/2009 | Alecu | ............ | F01D 25/18 184/11.2 |
| 2009/0191046 A1 * | 7/2009 | Bart | ............ | B01D 45/14 415/110 |
| 2009/0194062 A1 * | 8/2009 | Iwata | ............ | F01M 11/02 123/196 R |
| 2010/0275572 A1 * | 11/2010 | Durocher | ............ | F01D 9/065 60/39.08 |
| 2011/0197923 A1 * | 8/2011 | Battaglioli | ............ | B08B 3/02 134/18 |
| 2012/0321451 A1 * | 12/2012 | Xiao | ............ | F01D 9/041 415/180 |
| 2013/0019609 A1 * | 1/2013 | Wong | ............ | F01D 9/065 60/797 |
| 2013/0189071 A1 * | 7/2013 | Durocher | ............ | F01D 9/065 415/1 |
| 2013/0192235 A1 * | 8/2013 | Sanchez | ............ | F02C 7/12 60/772 |
| 2013/0199040 A1 * | 8/2013 | Dudeck | ............ | B23P 6/002 29/889.1 |
| 2014/0003922 A1 * | 1/2014 | Daniels | ............ | F01D 5/24 415/182.1 |
| 2014/0013769 A1 * | 1/2014 | Martin | ............ | F02C 7/20 60/796 |
| 2014/0127051 A1 * | 5/2014 | Takahashi | ............ | F01D 25/166 417/406 |
| 2014/0133978 A1 * | 5/2014 | Donaldson | ............ | F01D 25/16 415/229 |
| 2014/0182972 A1 * | 7/2014 | Hetherington | ............ | F02C 7/06 184/6.11 |
| 2014/0227078 A1 * | 8/2014 | Chokshi | ............ | F01D 9/065 415/68 |
| 2014/0255147 A1 * | 9/2014 | Root | ............ | F01D 25/285 415/1 |
| 2014/0256494 A1 * | 9/2014 | Lewis | ............ | F01D 25/18 475/159 |
| 2015/0233263 A1 * | 8/2015 | Battaglioli | ............ | F01D 25/002 134/56 R |
| 2015/0345400 A1 * | 12/2015 | Scott | ............ | F01D 9/065 60/796 |
| 2016/0177825 A1 * | 6/2016 | Burghardt | ............ | F01M 11/03 415/110 |

FOREIGN PATENT DOCUMENTS

| | | | | |
|---|---|---|---|---|
| EP | 2 085 579 A1 | 8/2009 | | |
| EP | 1 970 541 B1 | 4/2010 | | |
| FR | EP 1970541 A1 * | 9/2008 | ............ | F01D 25/30 |

* cited by examiner

EXHAUST CASING COMPRISING A FLUID DISCHARGE DEVICE AND TURBINE ENGINE

FIELD OF THE INVENTION

The invention relates to a turbine engine exhaust casing, comprising a device for discharging fluid, particularly oil. The invention also relates to a turbine engine comprising such an exhaust casing.

DESCRIPTION OF THE PRIOR ART

The exhaust casing is a structural part of a turbine engine conventionally arranged at the outlet of a turbine, before the exhaust nozzle.

The casing comprises a hub, an outer ring and a plurality of structural arms arranged circumferentially between the hub and the outer ring.

In order to lubricate parts of the turbine engine, such as for example the bearings, oil is introduced into the turbine engine and flows towards the parts to be lubricated.

At the exhaust casing, oil tends to accumulate.

However, the accumulation of oil is prohibited, as this accumulation represents a fire hazard in the turbine engine.

In the prior art, it has been proposed to discharge the oil from the exhaust casing via one or a plurality of discharge tubes.

This type of solution is relatively inflexible as it requires the addition of additional parts.

Moreover, it cannot be applied to exhaust casings having a more complex design and less available space.

DESCRIPTION OF THE INVENTION

The invention relates to a turbine engine exhaust casing, characterised in that it comprises a hub, an outer ring, a plurality of structural arms arranged circumferentially between the hub and the outer ring, a stiffener extending along at least a portion of the inner circumference of the hub, the hub comprising at least one discharge hole, and the stiffener comprising at least one discharge slot, so as to enable the discharge of a fluid from the casing.

The invention is advantageously completed by the following features, taken alone or in any of the technical possible combinations thereof:

a spoiler extending from the hub, the spoiler comprising at least one further discharge hole, to discharge the fluid from the casing;

the stiffener is a rib extending along the inner circumference of the hub;

the discharge hole of the hub and the discharge slot of the stiffener are arranged facing each other, in order to discharge the fluid via the slot and subsequently via the discharge hole;

the discharge hole of the hub and the discharge slot of the stiffener are arranged at an azimuth angle between 5 o'clock and 7 o'clock in the casing plane;

the discharge hole of the spoiler is arranged at an azimuth angle between 5 o'clock and 7 o'clock in the casing plane;

the discharge hole of the hub, the discharge slot and the discharge hole of the spoiler are arranged at an azimuth angle substantially equal to 6 o'clock in the casing plane;

the casing comprises a downstream cavity for holding fluid situated in the downstream portion of the casing, the discharge hole of the hub and the discharge slot of the stiffener being suitable for discharging the fluid from this downstream cavity;

the casing comprises an upstream cavity for holding fluid situated in the upstream portion of the casing, the discharge hole of the spoiler being suitable for discharging the fluid from this upstream cavity.

The invention also relates to a turbine engine comprising a turbine and an exhaust casing as described above at the turbine outlet.

The invention offers an effective solution for discharging oil from an exhaust casing, particularly an exhaust casing comprising complex means equipped with stiffeners and/or spoilers, and having an optimised design suitable for increasing the service life thereof (predicted service life in oligocyclic fatigue).

Although the design of such a casing gives rise to the creation of oil flow barriers, such as holding cavities, the invention is suitable for discharging this oil simply and effectively.

Furthermore, the invention offers a solution not requiring the incorporation of additional parts. In particular, the oil discharge device may be obtained when manufacturing the casing.

Finally, the invention is suitable for discharging oil without impacting the service life of the casing and the reinforcement of the stiffener.

DESCRIPTION OF THE FIGURES

Further features and advantages of the invention will emerge further from the description hereinafter, which is merely illustrative and not limiting, and should be read with reference to the appended figures wherein.

DETAILED DESCRIPTION

Figure 1:
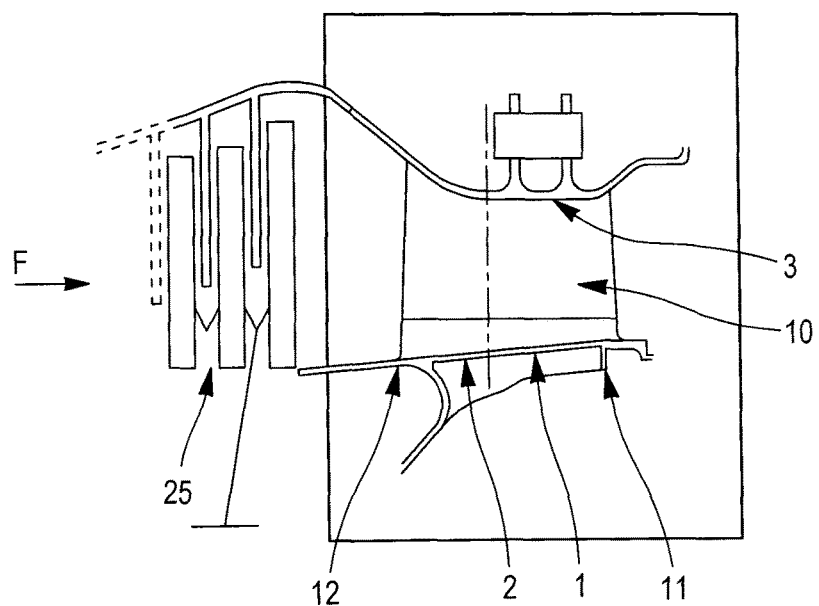
FIG. 1 is a representation of an embodiment of the upper part of a turbine engine portion (12 o'clock azimuth angle) comprising an exhaust casing according to the invention.
Figure 2:
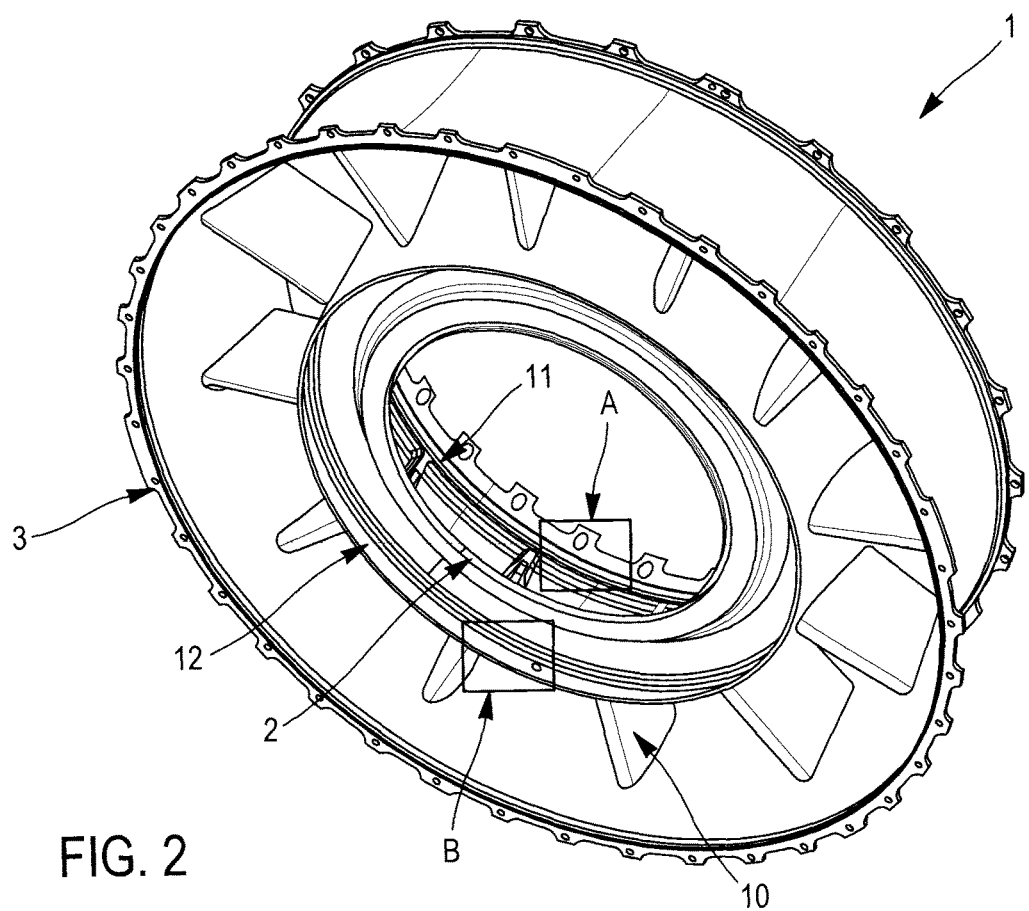
FIG. 2 is a three-dimensional representation viewed from upstream to downstream of an embodiment of an exhaust casing according to the invention.
Figure 3:
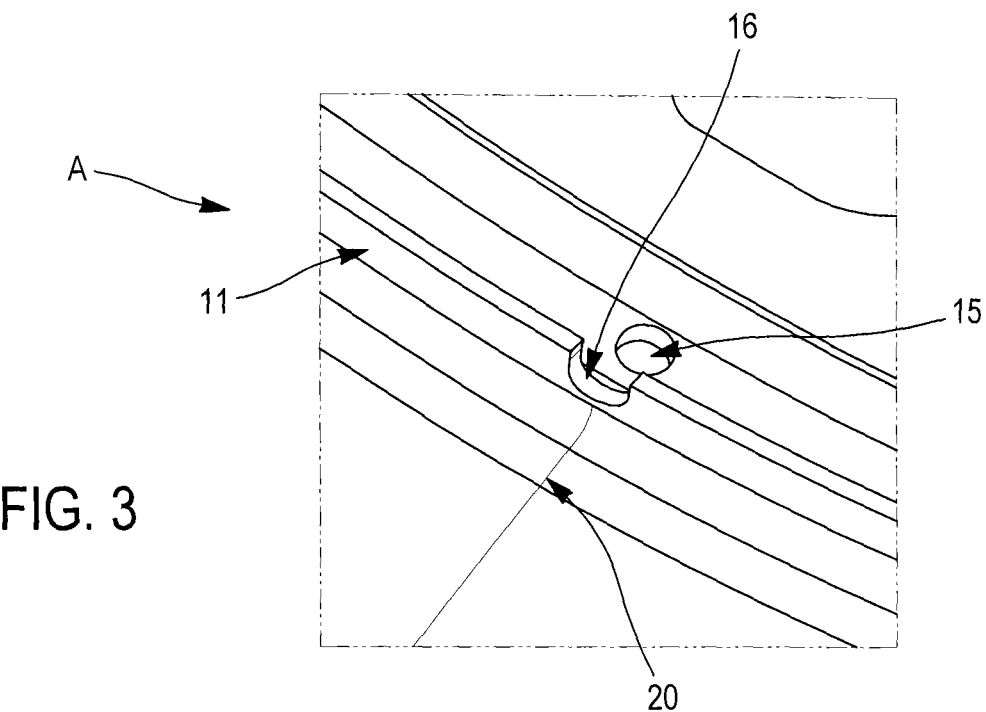
FIG. 3 is a three-dimensional representation of zone A in FIG. 2 (stiffener and hub)
Figure 4:
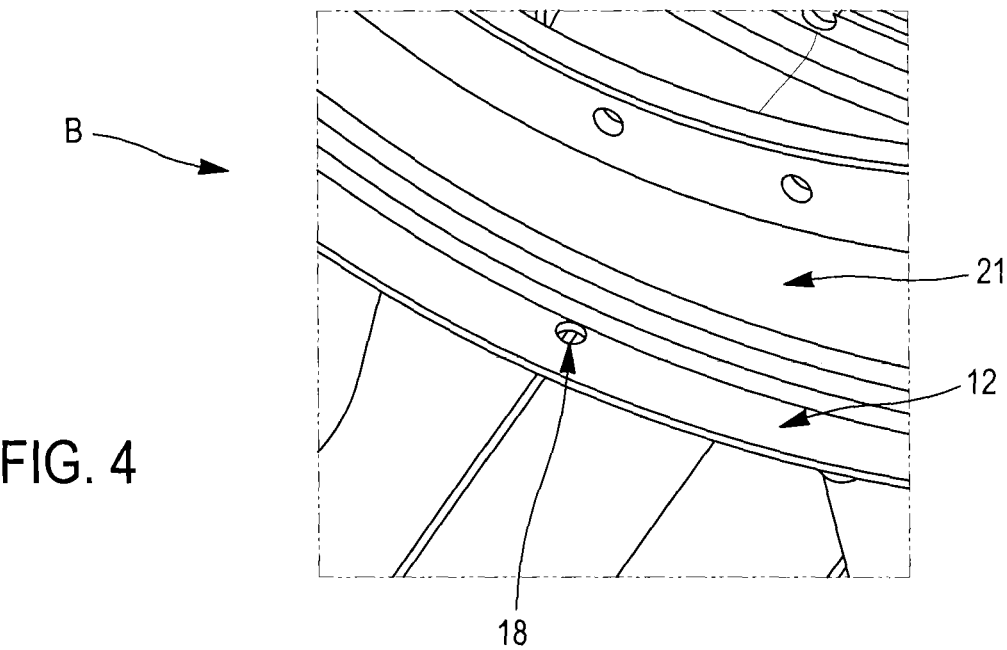
FIG. 4 is a three-dimensional representation of zone B of FIG. 2 (spoiler)

FIG. 1 represents a turbine engine portion comprising an exhaust casing 1. The exhaust casing 1 is detailed in FIG. 2 et seq.

The exhaust casing 1 is generally arranged at the outlet of a turbine 25, more frequently the low-pressure turbine, and before the exhaust nozzle (not shown).

It should be noted that upstream and downstream are defined with reference to the gas flow direction in the turbine engine.

The upstream to downstream gas flow direction is represented by the arrow F in FIG. 1.

The exhaust casing 1 is conventionally denoted using the expression "Turbine Rear Frame" by those skilled in the art. It consists of a structural part, particularly used to retain the structure of the turbine engine.

The exhaust casing 1 comprises a hub 2, embodied by an inner ring of casing 1.

The exhaust casing 1 further comprises an outer ring 3, also called a ferrule.

Between the hub 2 and the outer ring 3, a plurality of structural arms 10 are arranged. These structural arms, which may particularly be radial or tangential, are arranged circumferentially and link the hub 2 and the outer ring 3.

The term radial denotes the radial axis of the turbine engine, extending radially in relation to the longitudinal axis of the turbine engine (which is the primary flow axis of the turbine engine, upstream to downstream).

The term tangential arm denotes an arm arranged substantially tangentially in relation to the hub 2, i.e. with a pronounced inclination in relation to a merely radial arm.

The spaces between the structural arms 10 define exhaust openings, wherein the turbine engine flow (stream) circulates. In order to reinforce the hub 2, it has, on the inner circumference thereof, at least one stiffener 11. This stiffener 11 extends along all or part of the inner circumference of the hub 2. It generally consists of a radial rib extending internally from the inner circumference of the hub 2.

As mentioned above, it is necessary to have a device or arrangement for discharging a fluid liable to accumulate in the casing, which is typically oil.

For this purpose, the hub 2 comprises at least one discharge hole 15, and the stiffener 11 comprises at least one discharge slot 16, in order to discharge the fluid from the casing 1. The hole 15 is for example circular and has an axis arranged substantially radially. The slot 16 is suitable for retaining a stiffener portion 11 at this point, in order to retain the reinforcement function of the hub 2, while discharging the fluid.

Figure 5:
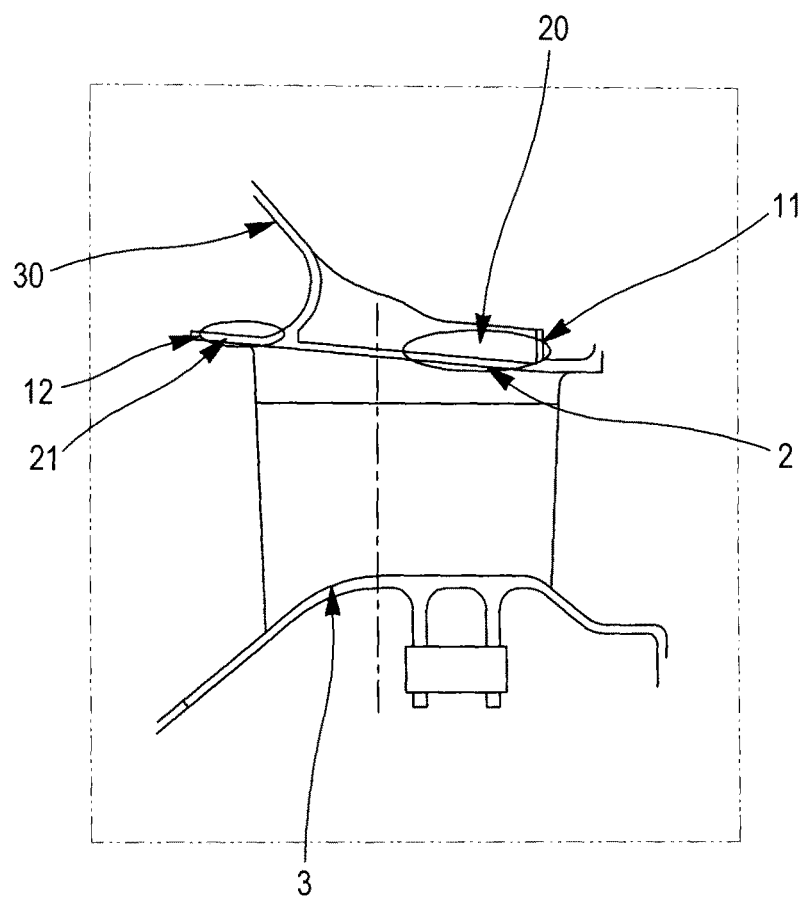
FIG. 5 is a representation of the lower part of the casing (azimuth angle of 6 o'clock), with zones representing cavities for holding fluid.

As illustrated in FIG. 5, the casing 1 comprises a downstream cavity 20 for holding fluid situated in the downstream part of the casing 1. This cavity 20 is particularly a result of the presence of the stiffener 11, which prevents the fluid from flowing outside the casing 1. The slope of the hub 2 at this level may also form a barrier to fluid flow.

Figure 6:
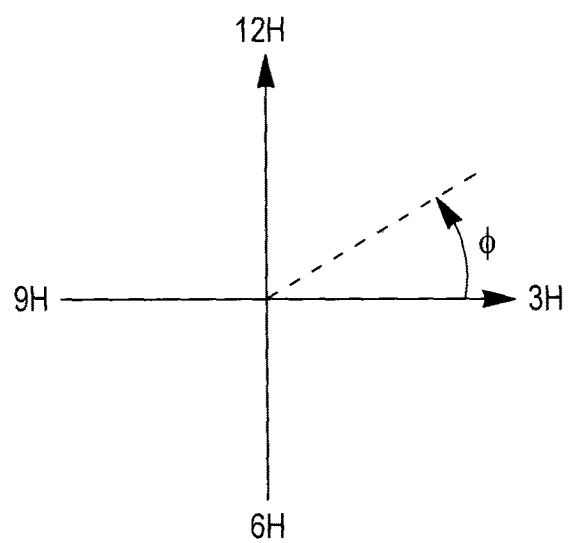
FIG. 6 is a representation of an azimuth angle with reference to a clock dial, in the casing plane.

It is noted that FIG. 5 illustrates the lower part of the hub and the casing 1, i.e. the part situated in an azimuth angle at around 6 o'clock (see in FIG. 5). It should be noted that the angle in the plane of the casing 1 can be defined with reference to a clock dial (azimuth angle Φ, represented in FIG. 6 in the plane of the casing 1).

The fluid can thus be discharged from the downstream holding cavity 20 via the discharge slot 16, making it possible to pass the stiffener 11, and then outside the casing 1 via the discharge hole 15 situated in the hub 2.

According to one possible embodiment, the discharge hole 15 and the discharge slot 16 are positioned facing each other. This juxtaposition makes it possible to facilitate discharge.

It is possible to provide a plurality of discharge slots 16 and a plurality of discharge holes 15. However, a single slot and a single hole are sufficient to enable fluid discharge. Furthermore, minimising the number of holes and slots makes it possible to reduce the impact of the solution on the mechanical strength of the casing 1 and enhance the service life thereof.

According to one embodiment, the casing 1 also comprises a spoiler 12 extending from the hub 2. The spoiler 12 is a circumferential extension in axial projection from the hub 2, towards the upstream of the casing 1.

The spoiler 12 particularly helps prevent flow losses from the turbine 25 preceding the casing 1 in the turbine engine in the upstream to downstream direction.

The spoiler 12 comprises at least one discharge hole 18, to discharge the fluid from the casing 1.

As represented in FIG. 5, the zone of the spoiler 12 has a slope tending to prevent the flow of oil outside the casing 1. Furthermore, a part 30 for attaching the casing 1, called an attachment point due to the shape thereof, prevents satisfactory flow of oil outside the casing 1.

In this way, the casing 1 has an upstream cavity 21 for holding fluid situated in the upstream part of the casing 1.

The presence of the discharge hole 18 of the spoiler 12 is suitable for discharging the fluid from this upstream cavity 21.

The position of the discharge holes and the discharge slot helps optimise fluid discharge.

According to one possible embodiment, the discharge holes 15 and the discharge slot 16 are arranged at an azimuth angle between 5 o'clock and 7 o'clock in the plane of the casing 1. Similarly, the discharge hole 18 of the spoiler 12 is arranged at an azimuth angle between 5 o'clock and 7 o'clock in the plane of the casing 1.

This zone (azimuth angle between 5 o'clock and 7 o'clock) corresponds to the lower part of the casing 1, towards which the oil tends to move due to gravity.

According to one possible embodiment, the discharge hole 15 of the hub 2, the discharge slot 16 and the discharge hole 18 of the spoiler 12 are arranged at an azimuth angle substantially equal to 6 o'clock in the plane of the casing 1.

The discharge hole 15 of the hub, the discharge slot 16 and the discharge hole 18 of the spoiler 12 may be either machined in the hub 2, or integrated in the hub 2 from the manufacture of the hub 2 by casting.

In the latter case, no machining step is required. Alternatively, it is possible to make the holes and the slot after the manufacture of the hub 2.

The lack of addition of additional parts thus facilitates the implementation of the invention on the casing 1.

Furthermore, the invention is suitable for discharging the fluid for the casing 1, simply and effectively, even though said casing, due to the complexity and design thereof, has a plurality of flow barriers.

Finally, the service life and the mechanical strength of the casing, which are crucial for this part, are not impacted.

The invention claimed is:

1. A turbine engine exhaust casing, comprising:
   a hub;
   an outer ring;
   a plurality of structural arms arranged circumferentially between the hub and the outer ring; and
   a stiffener extending along at least a portion of an inner circumference of the hub,
   the hub comprising a first discharge hole, and the stiffener comprising a discharge slot, wherein the first discharge hole and the discharge slot are configured to discharge oil from the turbine engine exhaust casing,
   wherein the first discharge hole of the hub and the discharge slot of the stiffener are arranged facing each other, in order to discharge the oil via the discharge slot and subsequently via the first discharge hole so as to enable the discharge of the oil from the turbine engine exhaust casing.

2. The turbine engine exhaust casing according to claim 1, further comprising:
   a spoiler extending from the hub, the spoiler comprising a second discharge hole, to discharge the fluid from the turbine exhaust casing.

3. The turbine engine exhaust casing according to claim 1, wherein the stiffener is a rib extending along at least the portion of the inner circumference of the hub.

4. The turbine engine exhaust casing according to claim 1, wherein the first discharge hole of the hub and the discharge slot of the stiffener are arranged at an azimuth angle between 5 o'clock and 7 o'clock in a casing plane, said casing plane being perpendicular to a longitudinal axis of the turbine engine.

5. The turbine engine exhaust casing according to claim 2, wherein the second discharge hole of the spoiler is arranged at an azimuth angle between 5 o'clock and 7 o'clock in a casing plane, said casing plane being perpendicular to a longitudinal axis of the turbine engine.

6. The turbine engine exhaust casing according to claim 2, wherein the first discharge hole of the hub, the discharge slot, and the second discharge hole of the spoiler are arranged at an azimuth angle substantially equal to 6 o'clock in a casing plane, said casing plane being perpendicular to a longitudinal axis of the turbine engine.

7. The turbine engine exhaust casing according to claim 1, further comprising a downstream cavity for holding the fluid situated in a downstream portion of the turbine engine exhaust casing, the first discharge hole of the hub and the discharge slot of the stiffener being configured to discharge the fluid from the downstream cavity.

8. The turbine engine exhaust casing according to claim 2, further comprising an upstream cavity for holding the fluid situated in an upstream portion of the turbine engine exhaust casing, the second discharge hole of the spoiler being configured to discharge the fluid from the upstream cavity.

9. The turbine engine exhaust casing according to claim 1, wherein the first discharge hole is offset between the structural arms and outside of the structural arms.

10. A turbine engine comprising:
a turbine; and
an exhaust casing at an outlet of the turbine, said exhaust casing comprising:
  a hub;
  an outer ring;
  a plurality of structural arms arranged circumferentially between the hub and the outer ring; and
  a stiffener extending along at least a portion of the inner circumference of the hub, the hub comprising at least one discharge hole, and the stiffener comprising at least one discharge slot, wherein the at least one discharge hole and the at least one discharge slot are configured to discharge oil from the exhaust casing,
wherein the at least one discharge hole of the hub and the at least one discharge slot of the stiffener are arranged facing each other, in order to discharge the oil via the at least one discharge slot and subsequently via the at least one discharge hole so as to enable the discharge of the oil from the exhaust casing.

* * * * *